(12) United States Patent
Gottschalk et al.

(10) Patent No.: US 6,715,778 B2
(45) Date of Patent: Apr. 6, 2004

(54) RADIO FREQUENCY-CONTROLLED AXLE/SUSPENSION LIFT SYSTEM

(75) Inventors: Michael J. Gottschalk, Granville, OH (US); Joseph M. Ross, Canton, OH (US); Jesse W. Cervantez, Navarre, OH (US); Richard R. Steiner, N. Canton, OH (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 10/161,284

(22) Filed: May 31, 2002

(65) Prior Publication Data

US 2002/0180172 A1 Dec. 5, 2002

Related U.S. Application Data

(60) Provisional application No. 60/295,117, filed on Jun. 1, 2001.

(51) Int. Cl.[7] .................................................. B60G 9/04
(52) U.S. Cl. .............................. 280/124.157; 280/86.5; 280/6.151; 280/6.153; 298/19 R
(58) Field of Search ........................... 280/6.15, 6.153, 280/124.157, 124.161, 86.5, FOR 161, 5.5, 5.515, 5.519, FOR 164; 267/64.28; 298/19 R

(56) References Cited

U.S. PATENT DOCUMENTS

| | | | | | |
|---|---|---|---|---|---|
| 4,696,517 | A | * | 9/1987 | Nagano | 298/19 R |
| 5,035,439 | A | * | 7/1991 | Petrillo | 280/81.5 |
| 5,193,063 | A | * | 3/1993 | Assh | 180/24.02 |
| 6,206,130 | B1 | * | 3/2001 | Hetler | 180/287 |
| 6,206,416 | B1 | * | 3/2001 | Faigle et al. | 280/735 |

FOREIGN PATENT DOCUMENTS

DE 3810386 * 10/1989 .............. 280/5.515

* cited by examiner

*Primary Examiner*—Eric Culbreth
(74) *Attorney, Agent, or Firm*—Buckingham, Doolittle & Burroughs, LLP; David P. Dureska; Edward T. Kennedy

(57) ABSTRACT

A control system for a heavy-duty vehicle such as a dump-type straight truck includes a portable radio frequency transmitter and a radio frequency receiver. The radio frequency receiver is operatively connected to a vehicle device or assembly which performs a function such as operation of the vehicle dump bed or raising and lowering of the vehicle axle/suspension system, so that the function can be controlled from the cab of the vehicle by the radio frequency transmitter, and whereby the function occurs substantially instantaneously due to the use of radio frequency and eliminates the need for a custom hard-wired control system.

8 Claims, 2 Drawing Sheets

RADIO FREQUENCY-CONTROLLED AXLE/SUSPENSION LIFT SYSTEM

This application claims the benefit of provisional application No. 60/295,117 filed Jun. 1, 2001.

BACKGROUND OF THE INVENTION

1. Field of the Invention

The invention relates to lift assemblies for vehicle axle/suspension systems, and in particular to the means for operating such lift assemblies. More particularly, the invention is directed to a radio frequency system which controls the air springs that lift and lower the axle/suspension system of a heavy-duty vehicle such as a straight truck or a semi-trailer, wherein the use of radio frequency eliminates the need for a relatively expensive and inefficient hard-wired lift assembly control system.

2. Background of the Invention

Axle/suspension lift assemblies have been used for many years on heavy-duty vehicles such as tractor-trailers or semi-trailers, straight trucks such as dump trucks, and the like. Such heavy-duty vehicles typically include certain ones of their axle/suspension systems which are equipped to be lifted and lowered. For example, after dumping a load, the operator of a dump truck may choose to lift one of the axle/suspension systems to save it from wear and tear, since it is no longer required to support the additional load previously contained in the dump bed. Pneumatic lift air springs typically are utilized to accomplish the lifting operation. The lift air springs are inflated or deflated for raising or lowering, respectively, the axle/suspension system. Conversely, the ride air springs are deflated or inflated when the axle/suspension system is raised or lowered, respectively.

Since such heavy-duty vehicles have a variety of other functions that require control, such as operating the dumping function on a dump truck, it can be appreciated that the operator of the vehicle desires to remain in the cab to control these functions, rather than stepping out of the cab each time a function needs to occur, which can be inconvenient and/or dangerous. Thus, a conventional manner of controlling such functions as axle/suspension system raising and lowering has been to install an air control panel in the cab. A pneumatic supply line or conduit typically is run between a compressed air supply tank mounted outside of the cab, through the cab body, and is operatively connected to the control panel. Air feed lines in turn must also be operatively connected to the air controls, passed through the cab body and run to the rear of the vehicle for operative connection to the lift and ride air springs.

Although such an arrangement allows for relatively satisfactory pneumatic control of axle/suspension system lift assemblies from the cab by the operator of the vehicle, there are several disadvantages with such prior art control systems. First, long runs of conduit or air lines must be utilized, which is expensive and inefficient. More particularly, utilizing such long runs of air line results in delayed or slow response time of the air springs when a signal is sent from the air control panel in the cab to lift or lower the axle/suspension system. In addition, such a hard-wired system requires a relatively large control panel to be mounted in a very limited space within the vehicle cab. Also, materials in addition to the air lines are required such as mounting hardware and the like, and due to the large number of components, installation of such a pneumatically-controlled system on a straight dump truck can take up to about a day of labor by an installer, and can take even longer on semi-trailer dump-type trucks.

Therefore, a need has existed for a more efficient and inexpensive system for controlling axle/suspension system lift assemblies of heavy-duty vehicles. The present invention solves the above-noted problems by utilizing a radio frequency control system for the axle/suspension system lift assembly, which is capable of sending a radio frequency signal from a portable transmitter located in the vehicle cab to a radio frequency receiver mounted adjacent to the axle/suspension system to be lifted.

SUMMARY OF THE INVENTION

Objectives of the present invention include providing a control system for lift assemblies of vehicle axle/suspension systems, which is capable of controlling the lifting and lowering of the axle/suspension system without the use of large numbers of the components, including substantially long runs of air line.

Another objective of the present invention is to provide such a control system which enables faster response time of the controlled lift assembly when compared to response times achieved by prior art control systems.

An additional objective of the present invention is to provide such a control system which eliminates the need for mounting of a relatively large control panel within the vehicle cab.

A still further objective of the present invention is to provide such a control system which is economical, durable in use, easy to install, maintain, and replace.

These objectives and advantages are obtained by a control system for a function of a heavy-duty vehicle, the control system including, a radio frequency transmitter, a radio frequency receiver mounted adjacent to and operatively connected to an assembly which performs the function, so that an operator can actuate the transmitter to send a radio frequency signal to the receiver for controlling the function.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

So that the radio frequency control system of the present invention for axle/suspension system lift assemblies can be best understood, a prior art control system is shown mounted on a dump-type straight truck in FIG. 1 and is described immediately below.

Figure 1:
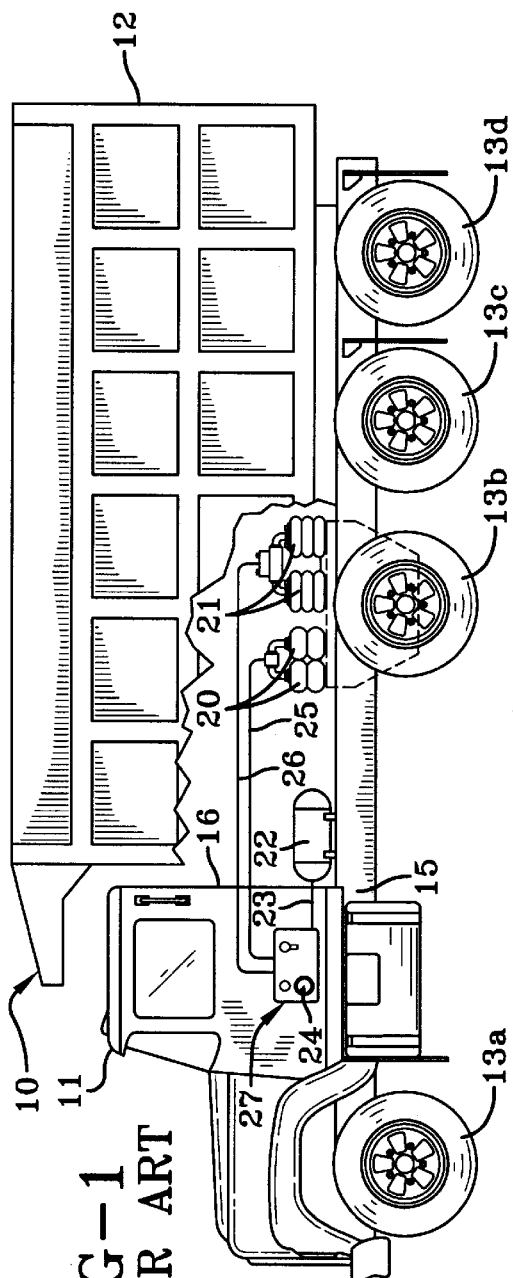
FIG. 1 is a schematic elevational view of a straight dump truck having a prior art hard-wired control system for an axle/suspension system lift assembly mounted thereon.

A conventional straight truck of the dump-type is indicated generally at 10 in FIG. 1. Dump truck 10 includes a cab 11 and a dump bed 12. Straight trucks such as dump truck 10 typically have from about four (4) to about six (6) total axles, with from about one (1) to about three (3) of those axles being equipped to be lifted. It is understood that conventional semi-trailers can have from about two (2) to about eight (8) axles, with from about one (1) to about four (4) of those axles being liftable. Dump truck 10 shown in FIG. 1 has four (4) axles (not shown), and each one of a plurality of tires, represented as 13a, 13b, 13c, and 13d, is attached to the driver's side end of a respective one of the axles. On truck 10, only the axle/suspension system to which tire 13b is attached is liftable.

As represented schematically in FIG. 1, typically two air springs 20 are utilized as part of the lift assembly used to lift an axle/suspension system. The axle/suspension system also includes a pair of ride air springs 21. A control system 27 for the lift assembly including lift air springs 20 and ride air springs 21, includes a supply tank 22 which is a source of compressed air for various systems of truck 10, including the brake systems (not shown) and the lift and ride air springs. Tank 22 typically is mounted on a frame 15 of truck 10, outside of cab 11. A conduit 23 is operatively attached to and fluidly communicates with supply tank 22 and a control panel 24 located within cab 11. Conduit 23 thus is passed through openings (not shown) that must be formed in cab wall 16. Each one of a pair of air feed lines 25, 26 is operatively attached to and fluidly communicates with control panel 24, and lift air springs 20 and ride air springs 21, respectively. Thus, each air feed line 25, 26 also passes through openings (not shown) formed in cab wall 16.

As can be clearly understood from the above description and FIG. 1, such a hard-wired control system 27 requires relatively long runs of conduit, particularly for air feed lines 25, 26, which is expensive and inefficient. More specifically, it is understood by those skilled in the art that such long runs of air line 25, 26 result in delayed or slow response time of lift and ride air springs 20, 21, respectively, when a signal is sent from control panel 24 in cab 11 by the operator to raise or lower the axle/suspension system. Also, air control panel 24 is relatively large and must be mounted in a limited space within cab 11. Thus, it can be seen that a large number of components are required for prior art control system 27 schematically represented in FIG. 1 and described above, thus driving up cost not only due to the number of parts, including add-on mounting brackets and the like, but also because of the time required for installation, which can be up to about a day of labor by an installer for dump truck 10, and possibly even longer on dump-type semi-trailers.

Figure 2:
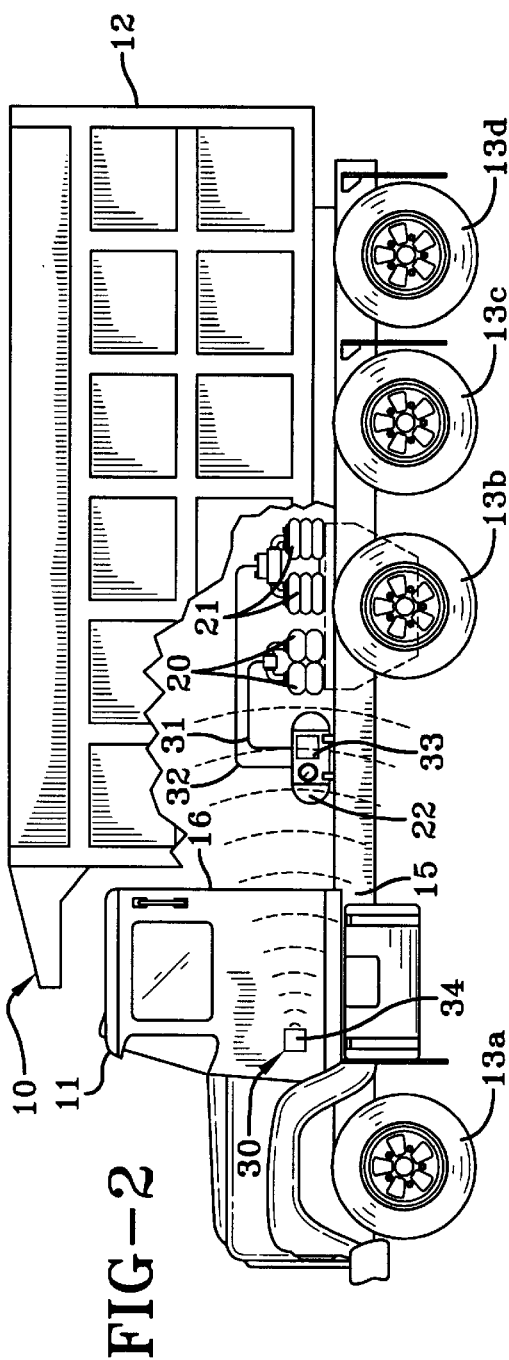
FIG. 2 is a view similar to FIG. 1, but showing the radio frequency control system of the present invention mounted on the dump truck.

FIG. 2 shows a schematic representation of radio frequency control system 30 of the present invention. System 30 is shown installed on dump truck 10, and only the differences between prior art control system 27 and present invention control system 30 will be discussed in detail below. Control system 30 also operates a pair of lift assembly air springs 20 and ride air springs 21. However, compressed air supply tank 22 is mounted on truck frame 15 adjacent to lift air springs 20 and ride air springs 21. Thus, a relatively short run of air feed line 31 is operatively attached to and fluidly communicates with supply tank 22 and air springs 20. Similarly, another relatively short run of air feed line 32 is operatively attached to and fluidly communicates with supply tank 22 and air springs 21.

In accordance with one of the key features of the present invention, a radio frequency receiver 33, of a type which is well known in the art, is mounted on or adjacent to air supply tank 22. More specifically, receiver 33 is operatively connected to and controls the various valves (not shown) of the lift assembly, such as by a solenoid which is well-known in the art, which in turn regulate the flow of pressurized air between tank 22 and air springs 20, 21, via feed lines 31, 32, respectively. A relatively small and portable radio frequency transmitter 34 then can be taken into cab 11 by the operator of the truck and is capable of sending a radio frequency signal to radio frequency receiver 33 mounted near or on air tank 22. More particularly, when it is desired by the operator to inflate or deflate lift air springs 20 and deflate or inflate ride air springs 21, for raising or lowering, respectively, the respective axle/suspension system of those air springs, a radio frequency signal is sent from transmitter 34 to receiver 33. Thus, control system 30 of the present invention has many advantages over prior art control system 27.

More particularly, control system 30 of the present invention eliminates penetration of cab wall 16 by an air supply conduit and air feed lines, and eliminates the need for relatively long air feed lines as well as the need for an air supply conduit 23 such as found in prior art control system 27. Moreover, the relatively short run of air feed lines 31, 32 between supply tank 22 and lift and ride air springs 20, 21, respectively, together with the use of radio frequency, results in relatively quick response of the air springs from the time the operator of the vehicle sends a radio frequency signal via portable radio frequency transmitter 34 in cab 11 to radio frequency receiver 33 mounted on air supply tank 22. Also, such a system having less components is less expensive and can be installed in less than about an hour. Finally, the present invention contemplates that a trailer of a tractor-trailer equipped with radio frequency receiver 33, could be pulled by any tractor since radio frequency transmitter 34 is portable and is not hard-wired to a particular tractor. Specifically, transmitter 34 could be conveniently moved from tractor to tractor because the frequency of the portable transmitter matches that of the receiver of a particular trailer to be pulled by the tractor.

Figure 3:
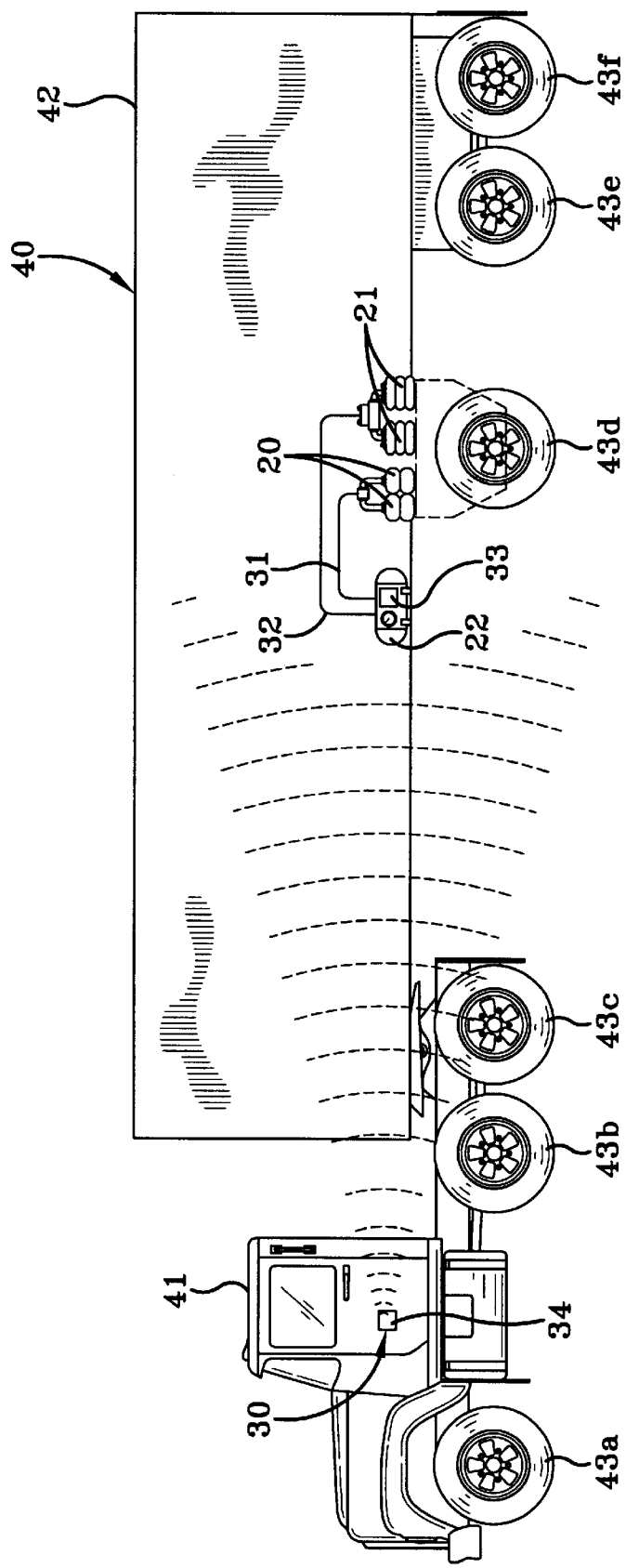
FIG. 3 is a schematic view similar to FIG. 2, but showing the radio frequency control system of the present invention mounted on a semi-trailer.

As noted hereinabove, control system 30 of the present invention also can be utilized on other types of heavy-duty vehicles such as semi-trailers, the various types of which are well known to those having ordinary skill in the trucking art. One type of semi-trailer is shown in FIG. 3 and is indicated at 40. More particularly, semi-trailer 40 is of the type commonly known as a van trailer and includes a tractor 41 and a trailer 42. Since the components of control system 30 of the present invention as used on semi-trailer 40 are identical to those used on dump truck 10 described hereinabove and shown in the drawings, and are mounted thereon in generally the same manner, the same numerals will be used to indicate the various components of the control system as were used in the description of the system's use on the dump truck. As was noted hereinabove, there are various types of straight trucks with dump trucks merely being one type of straight truck. Similarly, there also are various types of semi-trailers, with the van-type shown in FIG. 3 being but one type. As also noted hereinabove, conventional semi-trailers typically have from about two (2) to about eight (8) axles, with from about one (1) to about four (4) of those axles being liftable. As shown in FIG. 3, semi-trailer 40 has six (6) axles (not shown), and each one of a plurality of tires, represented as 43a through 43f, is attached to the driver's side end of a respective one of the axles. On semi-trailer 40, only the axle/suspension system to which tire 43d is attached is liftable. As with dump truck 10 described hereinabove, control system 30 of the present invention also operates a pair of lift assembly air springs 20 and a pair of ride air springs 21. Compressed air supply tank 22 is mounted on the frame (not shown) of trailer 42 adjacent to lift air springs 20 and ride air springs 21. Thus, a relatively short run of air feed line 31 is operatively attached to and fluidly communicates with supply tank 22 and lift air springs 20. Similarly, another relatively short run of air feed line 32 is operatively attached to and fluidly communicates with supply tank 22 and ride air springs 21.

Radio frequency receiver 33 is mounted on or adjacent to air supply tank 22. As in dump truck 10 described hereinabove, receiver 33 is operatively connected to and controls the various valves (not shown) of the lift assembly, such as by a solenoid, which in turn regulate the flow of pressurized air between tank 22 and air springs 20, 21, via feed lines 31, 32 respectively. Portable radio frequency transmitter 34 then can be taken into the cab of tractor 41 by the operator of semi-trailer 40 and is capable of sending a radio frequency signal to radio frequency receiver 33 mounted near or on air tank 22. When it is desired by the operator to inflate or deflate lift air springs 20 and deflate or inflate ride air springs 21, for raising or lowering, respectively, the respective axle/suspension system of those air springs, a radio frequency signal is sent from transmitter 34 to receiver 33. Thus, control system 30 of the present invention, when incorporated into semi-trailer 40, has the same advantages over prior art control system 27 as described hereinabove for its incorporation into dump truck 10. Additional advantages unique to the application of control system 30 of the present invention in semi-trailers already have been described hereinabove.

It is understood that radio frequency control system 30 of the present invention could be adapted to perform other control functions on heavy-duty vehicles such as dumping operations, without affecting the overall concept of the present invention.

Accordingly, the radio frequency control system for axle/suspension system lift assemblies is simplified, provides an effective, safe, inexpensive, and efficient system which achieves all the enumerated objectives, provides for eliminating difficulties encountered with prior axle/suspension lift assembly control systems and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved radio frequency control system for axle/suspension system lift assemblies is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A control system for a vehicle selected from the group consisting of semi-trailers and straight trucks, said control system including:
   a) a radio frequency transmitter; and
   b) a radio frequency receiver mounted adjacent to and operatively connected to an assembly which performs a function of said vehicle of raising and lowering an axle/suspension system so that an operator can actuate said transmitter to send a radio frequency signal to said receiver for controlling the function.

2. The control system of claim 1, in which said transmitter is portable.

3. The control system of claim 1, in which said assembly is a lift assembly of said axle/suspension system.

4. The control system of claim 1, in which said radio frequency signal is sent from said transmitter to said receiver substantially instantaneously.

5. A method of controlling a vehicle selected from the group consisting of semi-trailers and straight trucks, said method including the steps of:
   a) actuating a radio frequency transmitter to send a radio frequency signal to a radio frequency receiver mounted adjacent to and operatively connected to an assembly which performs a function of said vehicle of raising and lowering an axle/suspension system so that the function can be controlled.

6. The method of controlling a vehicle function of claim 5, in which said transmitter is portable.

7. The method of controlling a vehicle function of claim 5, in which said assembly is a lift assembly of said axle/suspension system.

8. The method of controlling a vehicle function of claim 5, in which said radio frequency signal is sent from said transmitter to said receiver substantially instantaneously.

* * * * *